Oct. 13, 1925.  1,557,406
F. W. BENNEFELD
CORN HARVESTING MACHINE
Filed May 14, 1923   3 Sheets-Sheet 2
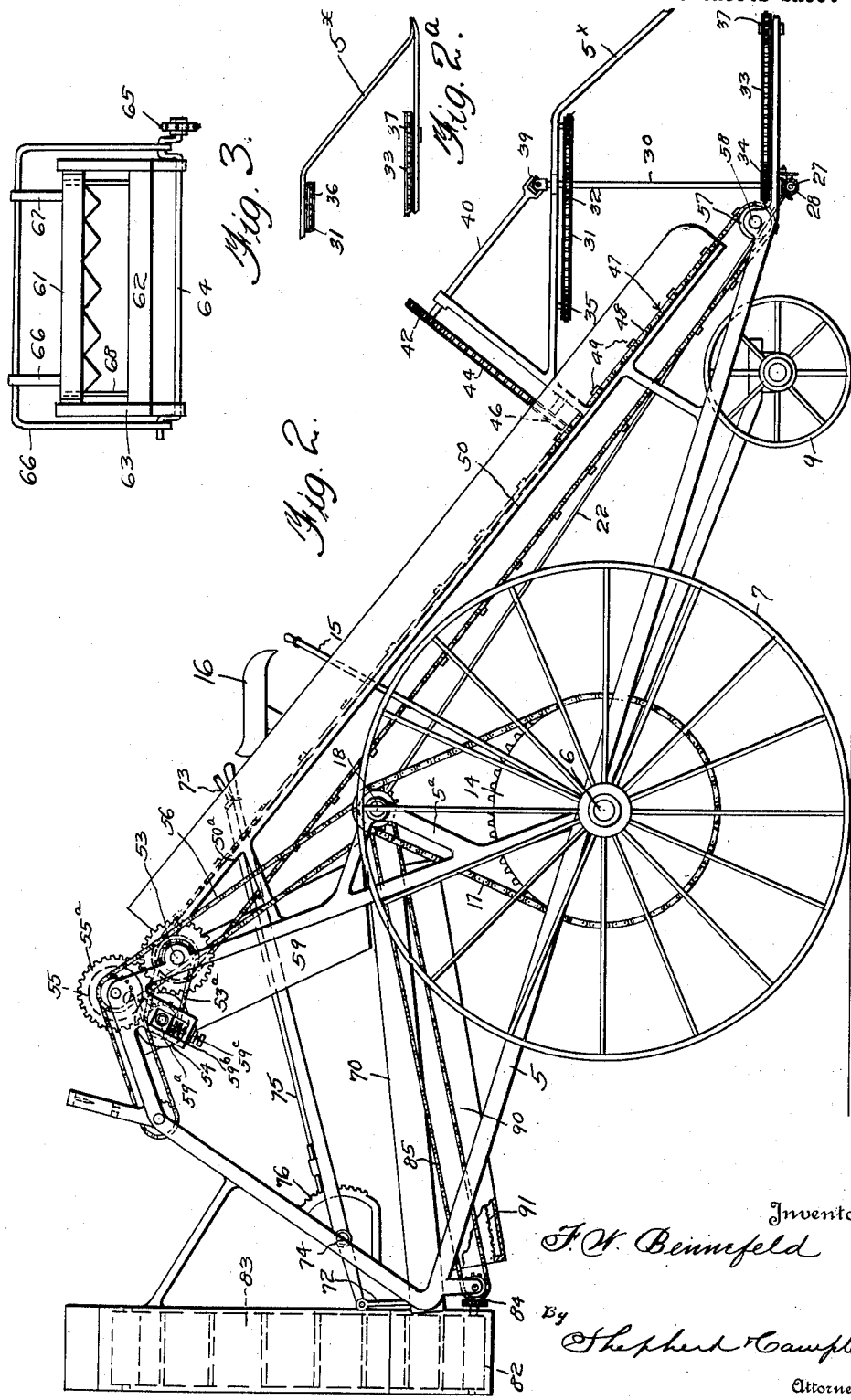

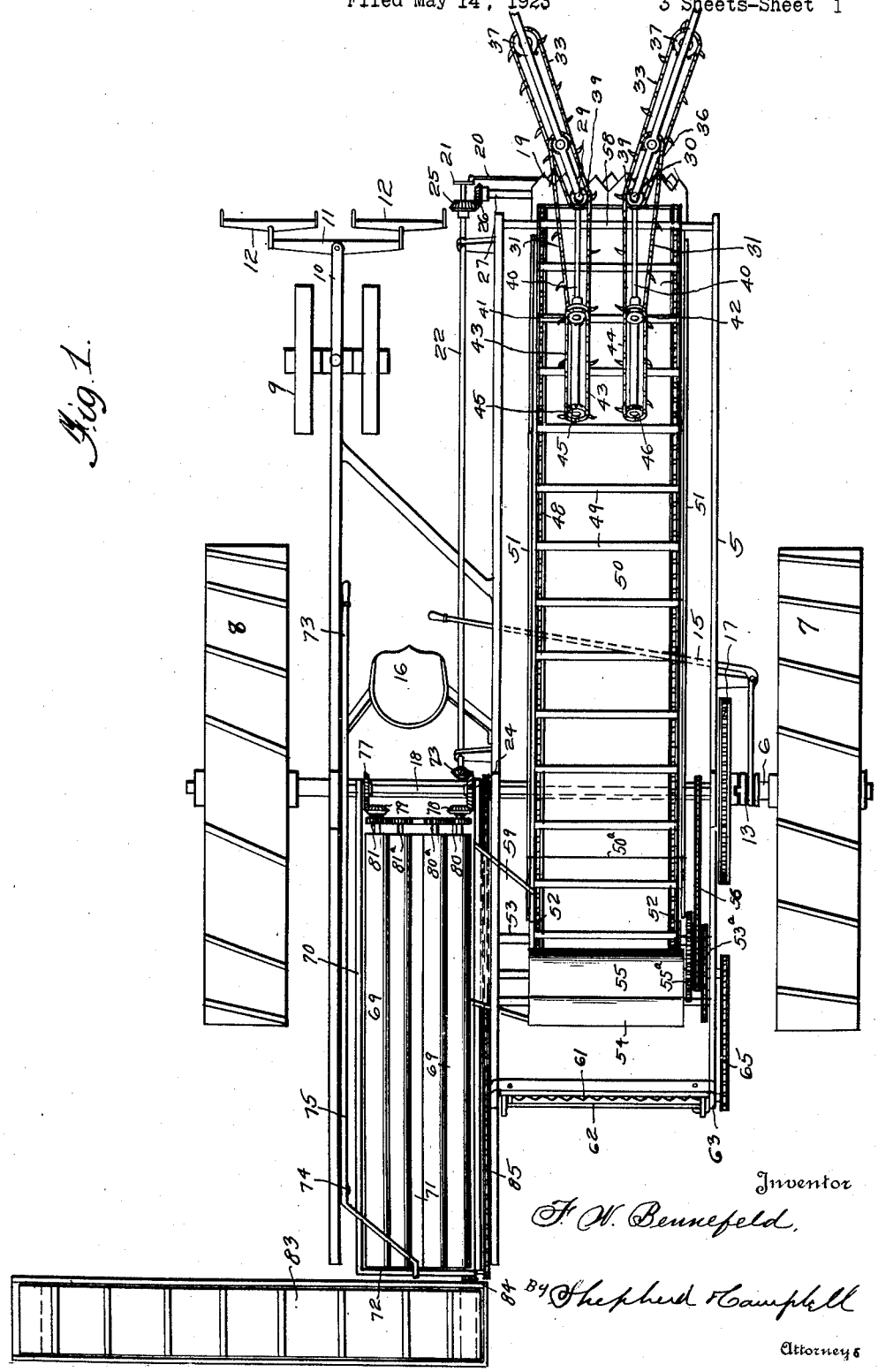

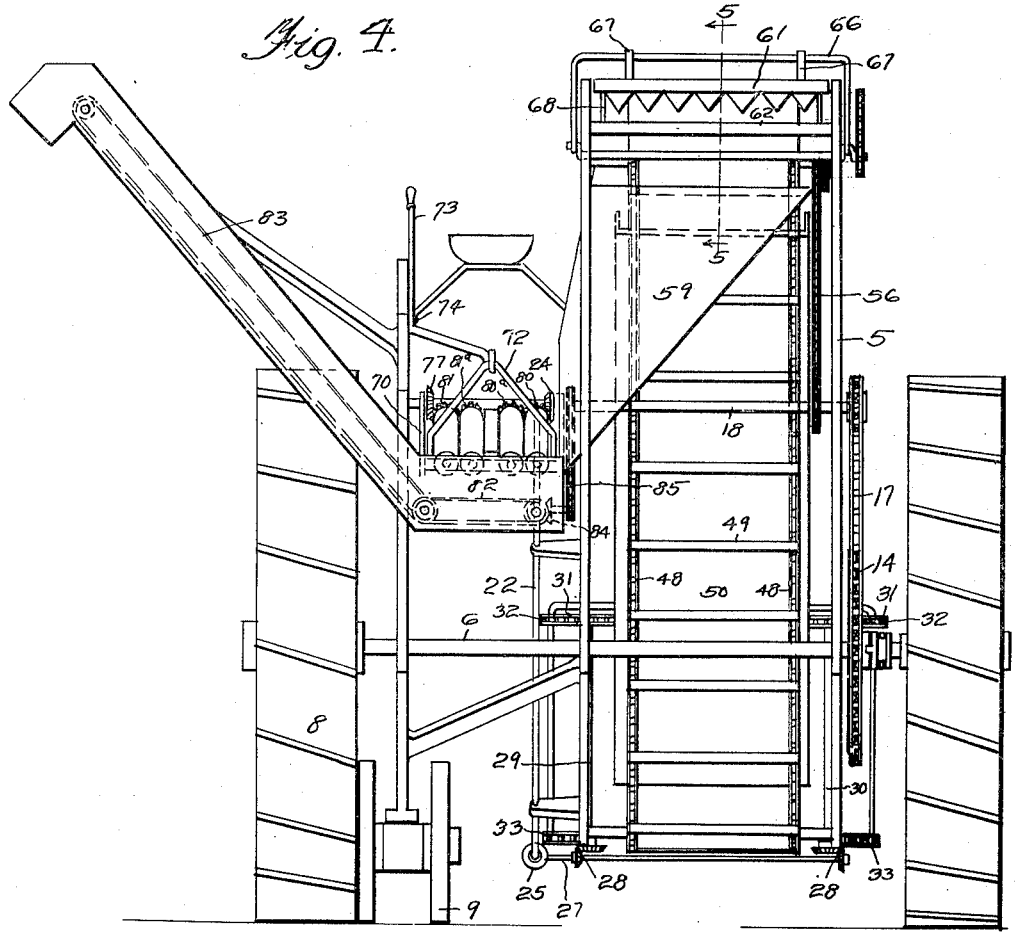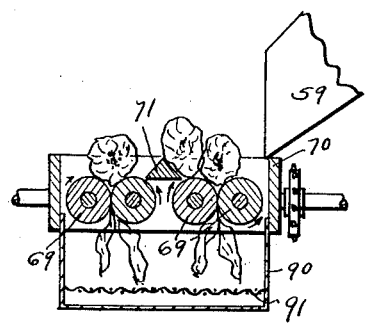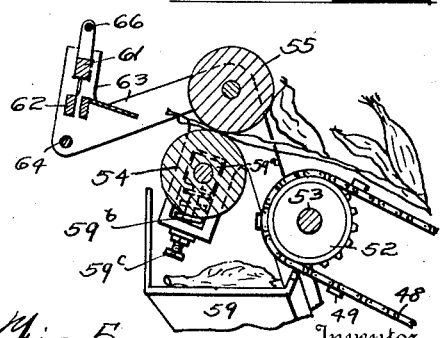

Patented Oct. 13, 1925.

1,557,406

UNITED STATES PATENT OFFICE.

FRED W. BENNEFELD, OF GIRARD, KANSAS.

CORN-HARVESTING MACHINE.

Application filed May 14, 1923. Serial No. 638,900.

*To all whom it may concern:*

Be it known that I, FRED W. BENNEFELD, a citizen of the United States, residing at Route #6, Girard, in the county of Crawford and State of Kansas, have invented certain new and useful Improvements in Corn-Harvesting Machines, of which the following is a specification, reference being had therein to the accompanying drawings.

This invention relates to a corn harvesting machine and has for its object to provide an improved device of this character adapted to sever the standing stalks with the ears thereon; deposit said stalks in the proper position upon a feed elevator; conduct said stalks and ears to snapping rolls by which the ears are snapped from the stalks; chop the stalks into relatively small pieces and discharge them upon the ground; deliver the ears with the husks thereon to husking rolls which remove the husks from the ears of corn and then deliver the husked ears to a discharge elevator by which they may be discharged into a wagon or like receptacle during the travel of the machine.

It is a further object of the invention to provide a machine capable of carrying out the foregoing objects and wherein the travel of the corn, though under the influence of gravity during part of its travel, is maintained effectively throughout the varying inclinations assumed by the machine, as a whole, in traveling over hilly and rough ground.

A further object of the invention is to provide an improved mechanism for insuring that the stalks with the ears thereon will be delivered to the feed elevator in such manner that they will travel head first and thus be delivered to the snapping rolls in such position as to insure that the ears will be snapped therefrom with efficiency and dispatch.

Further objects and advantages of the invention will be set forth in the detailed description which follows.

In the accompanying drawings:

Fig. 1 is a plan view of a corn harvesting machine constructed in accordance with the invention;

Fig. 2 is a side elevation thereof;

Fig. 2ª is a detail view of the front end of the machine;

Fig. 3 is a detail view of a chopping knife hereinafter described;

Fig. 4 is a rear elevation of the machine;

Fig. 5 is a vertical sectional view upon line 5—5 of Fig. 4 illustrating the snapping rolls and chopping knife; and Fig. 6 is a cross section of the husking roll assembly.

Like numerals designate corresponding parts in all of the figures of the drawings.

In the drawings 5 designates the main frame of a machine which is mounted upon a transverse axle 6 and ground wheels 7 and 8. A pony truck 9 is provided with tongue 10, double tree 11 and single trees 12.

While I have chosen to illustrate a machine drawn by horse power, it is to be understood that it is within the scope of the invention to mount a gasoline engine or other type of motor on the machine and to propel the same thereby, these two methods of propelling agricultural machinery being now well recognized as the equivalents of each other. Any suitable means of propelling the several parts of the mechanism from the ground wheels may be employed, that shown in the present instance for the purpose of illustrating the principles of the invention comprising a clutch 13 which serves to clutch the ground wheel 7 to a sprocket wheel 14 when an operating handle 15 is manipulated from the driver's seat 16. The sprocket wheel 14 drives through a chain 17 to a transverse shaft 18 supported in frame members 5ª and this transverse shaft 18 constitutes the main drive shaft of the machine. From this main drive shaft 18 a sickle or cutter bar 19 of a well known and conventional form is operated through the medium of a pitman 20, crank disc 21, inclined shaft 22 and beveled gearing 23, the latter meshing with a beveled gear 24 on the shaft 18.

The shaft 22 drives by beveled gears 25 and 26 to a transverse shaft 27. This transverse shaft, through the medium of beveled gearing 28 operates vertical shafts 29 and 30. Upper sprocket chains 31 are driven from these vertical shafts by a sprocket wheel 32 and lower sprocket chains 33 are driven from these vertical shafts by sprocket wheels 34. The upper sprocket chains 31 pass over idle sprockets 35 and 36 and the lower sprocket chains 33 pass over idle sprockets 37 at their forward ends. The lower sprocket chains 33 and those portions of the upper sprocket chains which lie forwardly of the sprocket wheels 32 are divergent and serve to guide the standing stalks to the sickle 19.

The upper ends of the vertical shafts 29 and 30 are connected by universal joints 38 and 39 with inclined shafts 40. These shafts operate sprocket wheels 41 and 42 which, in turn, operate sprocket chains 43 and 44, the lower ends of the latter passing over idle sprocket wheels 45 and 46. The forward divergent or rearwardly convergent chains gather the standing stalks as stated and direct them to the sickle which severs them and the inclined chains 43 and 44 insure that these stalks will be carried head end foremost upon an upwardly traveling feed conveyor 47. This conveyor consists of chains 48 and transverse slats 49, said slats traveling over a floor or plate 50 which is provided for a portion of its length with upstanding guides 51 and which floor terminates at 50$^a$. The chains 48 of the conveyor 47 pass over sprocket wheels 52 upon a shaft 53. This shaft is driven by sprocket gearing 55$^a$ from the shaft of upper snapping roll 55. A lower snapping roll 54 is driven by sprocket gearing 53$^a$ from the shaft 53. The upper snapping roll is driven by sprocket gearing 56 from shaft 18. The lower portions of the sprocket chains 48 of the feed conveyor pass over sprocket wheels 57 upon a transverse shaft 58.

The ascending stalks with the ears thereon are conducted by the feed conveyor 47 to the upper and lower snapping rolls 55 and 54 between which the stalks are carried. The ears are snapped off from the stalks and fall into a chute 59 by which they are delivered to the husking roll assembly, hereinafter described.

These stalks freed of the ears are carried through the snapping rolls by the movement of these rolls to a chopping mechanism consisting of a vertically reciprocating knife 61. This knife coacts with a fixed cutter bar 62 carried by rigid frame members 63. A crank shaft 64 to which rotation is imparted through sprocket gearing 65 from the shaft of the upper snapping roll, actuates a pitman yoke 66. The upper portion of this yoke pivotally engages upstanding arms 67 upon knife 61. The knife is further guided upon guide rods 68 which are carried by the bar 62. As the knife is vertically reciprocated under the influence of the crank shaft 64 and associated parts, these stalks are chopped into relatively small pieces and discharged upon the ground at the rear of the machine.

In the meantime the ears which have been delivered to the husking roll assembly 60 are caused to travel downwardly and rearwardly over the husking rolls 69. These husking rolls may be of any desired number and are preferably arranged in pairs, as illustrated in Fig. 1. These rolls are mounted in a tiltable frame 70 and this frame preferably carries a baffle or deflector bar 71 by which the ears with the husks thereon are deflected toward the pairs of husking rolls. The forward end of the frame 70 is supported upon the shaft 18 and the inclination of the frame and consequently the inclination of the whole husking roll assembly may be varied through the medium of a yoke 72 and an operating handle 73. This handle is pivoted at 74 and is accessible from the driver's seat 16. It is preferably provided with a latch and segment 75 and 76 of a well known and conventional form and the function of the handle and yoke is to vary the inclination of the husking roll assembly with respect to the main frame of the machine so that the proper inclination of the husking roll assembly may be maintained irrespective of the level of the ground over which the machine is traveling. This is important in a construction where the travel of the ears to be husked, along the husking rolls is under the influence of gravity, since otherwise with the machine traveling down hill the travel of the ears might cease entirely, while the machine traveling up hill the ears would slide along the rolls so fast that they would reach the discharge elevator before being completely husked. The husking rolls are driven from shaft 18 by means of the bevel gear 24 and a bevel gear 77, said beveled gears meshing respectively with bevel gears 78 and 79, each of which drives a pair of the husking rolls through the spur gears 80, 80$^a$ and 81, 81$^a$.

The husked ears are discharged from the rear end of the husking roll assembly upon a discharge elevator consisting of a short horizontal portion 82 and a longer inclined portion 83 and this elevator serves to discharge the husked ears into a wagon which may be driven alongside of the harvesting machine during the travel of the latter. The discharge elevator is driven by bevel gearing 84 and a sprocket gearing 85 from the shaft 18.

I prefer to yieldably mount the lower snapping roll to accommodate the varying sizes of stalks which pass between these snapping rolls and to this end the shaft of this snapping roll is mounted in boxes 59$^a$ which are spring supported by springs 59$^b$. The downward yielding movement of the boxes 59$^a$ is limited by a set screw 59$^c$ whereby I am able to insure that under no circumstances will rolls be forced far enough apart to permit the ears to pass therethrough.

I may, if desired, provide the husking roll assembly with a box 90 which is open at its ends above a screen 91 but closed below that point. The space below the screen 91 receives any corn which may be shelled in the operation of husking.

In Fig. 2 I have illustrated the extreme front end of the frame members of the machine from which it will be seen that these members comprise inclined bars 5ˣ which slip under any leaning stalks of corn, said stalks sliding upward along these inclined portions and being straightened up until they are engaged by the chains before being severed by the sickle. By virtue of this construction the stalks will be carried back in as good shape as though they were standing upright when cut.

It is to be understood that the invention is not limited to the precise construction set forth but that it includes within its purview whatever changes fairly come within either the terms or the spirit of the appended claims.

Having described my invention what I claim is:

1. In a machine of the character described, the combination with a wheeled supporting frame, of an inclined elevator, the lower end of which terminates at the forward end of the machine, gathering mechanism disposed at the opposite sides of the elevator and at the front end thereof, and comprising two groups of chains, one upon each side of said elevator, each group comprising three chains, two of the chains of a group being substantially horizontal and one being located materially above the other, the latter chain being stepped rearwardly with respect to the former and said horizontal chains at the opposite sides of the elevator being forwardly divergent to present a flaring mouth, the third chains of the groups extending and travelling substantially at right angles to the elevator, whereby the horizontal chains gather the stalks and deliver them to the elevator and the third chains carry the heads of the stalks downwardly upon the elevator to insure that the stalks will travel head first up the elevator.

2. A structure as recited in claim 1 in combination with means for driving all of said chains in unison comprising horizontal sprocket wheels over which the horizontal chains travel, vertical driven shafts by which some of said sprocket wheels are carried, universal joints upon the upper ends of said shafts, inclined shafts connected to and driven by said universal joints and sprocket wheels carried by said inclined shafts and driving the third chains of the groups.

In testimony whereof I hereunto affix my signature.

FRED W. BENNEFELD.